April 21, 1970   H. P. ZARTLER   3,507,314
SELF-LOCKING BARREL NUT
Filed Oct. 18, 1968
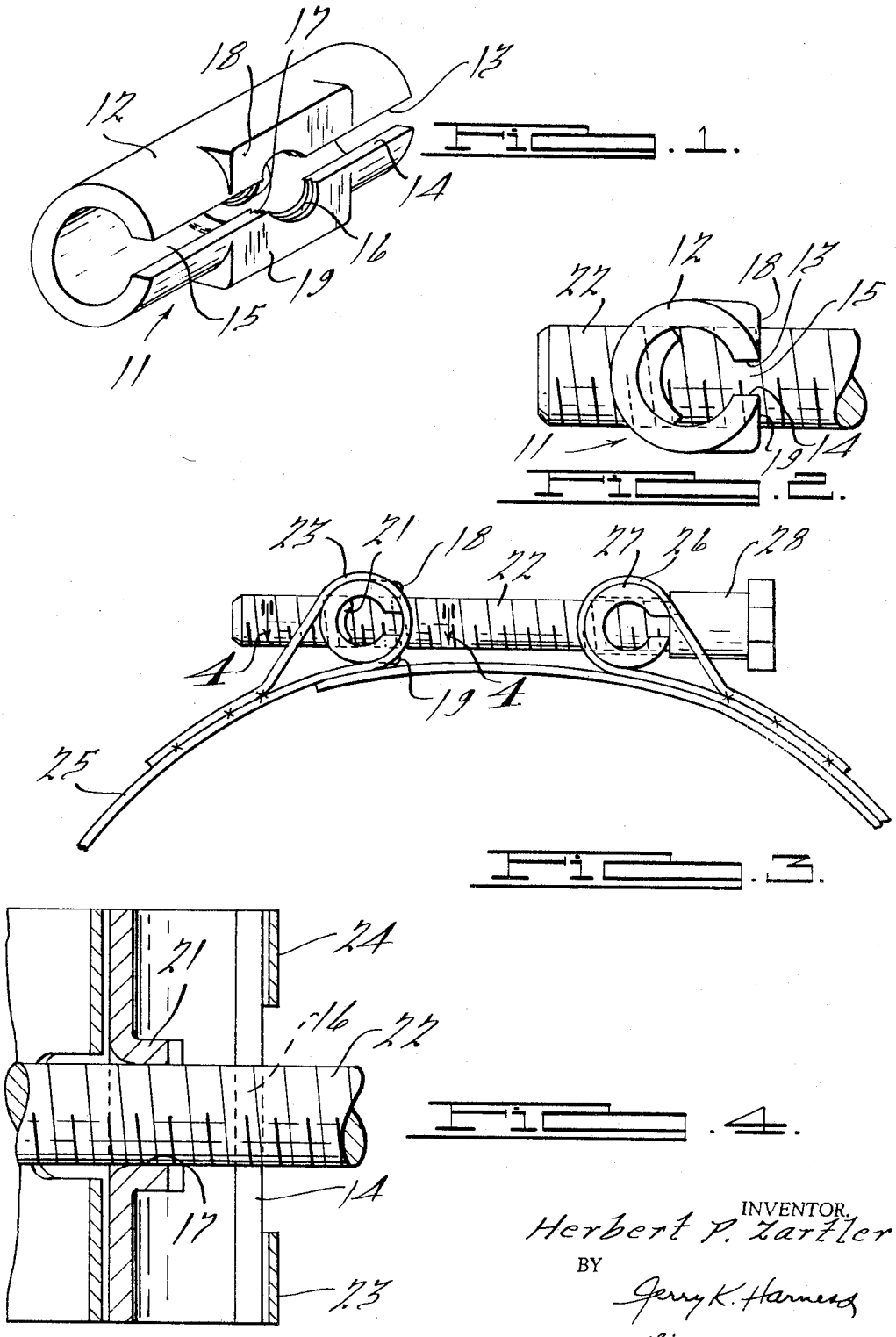
INVENTOR.
Herbert P. Zartler
BY
Jerry K. Harness
His ATTORNEY.

United States Patent Office 3,507,314
Patented Apr. 21, 1970

3,507,314
SELF-LOCKING BARREL NUT
Herbert P. Zartler, Grenada Hills, Calif., assignor to Aeroquip Corporation, Jackson, Mich.
Filed Oct. 18, 1968, Ser. No. 768,774
Int. Cl. B65d 63/06; F16b 39/28, 39/286
U.S. Cl. 151—21                    5 Claims

ABSTRACT OF THE DISCLOSURE

A nut in the shape of a longitudinally split cylinder with transversely aligned threaded apertures, one of the apertures being at the split and the other diametrically opposite the split. When tightened against a pair of bands crossing the split, by rotation of a bolt passing through the apertures, the nut will be contracted and threads at the split drawn tightly against the bolt. Loosening of the nut will permit expansion thereof, releasing the locking action.

BACKGROUND OF THE INVENTION

Field of the invention

The invention relates to sheet metal barrel nuts used where the fastener must pivot with respect to one or both of the parts being tightened.

Description of the prior art

Previous barrel nuts have not been provided with a self-locking construction such as is shown in the present invention. Separate means such as lock nuts were used to secure the parts in position.

SUMMARY OF THE INVENTION

According to the invention, a cylinder is formed by bending a sheet metal stamping, with a space between the facing edges of the cylinder. Two aligned transverse apertures are formed in the midportion of the cylinder, one being centered on the split and the other diametrically opposite the split. The aperture at the split is upset to form locating protrusions, while the material surrounding the other aperture is bent inwardly to increase the length of this aperture. Both apertures are then tapped to receive a bolt.

In use, the nut engages a pair of bands which extend across the split on either side of the locating protrusions. Because of the cylindrical shape of the nut, it may rock with respect to the bands as the nut is tightened.

The pressure of the bands across the split in the cylinder will create a contracting force on the cylinder, causing the threads at the split aperture to tighten against the bolt threads. This will result in a self-locking action. Upon loosening of the nut with respect to the band, the residual stresses in the nut will release the tightening action.

BRIEF DESCRIPTION OF THE DRAWINGS

FIGURE 1 is a perspective view of the barrel nut shown in its unstressed position;

FIGURE 2 is a side elevational view of the nut shown in conjunction with a bolt;

FIGURE 3 is a view of a strap being drawn tight by a bolt threaded into the barrel nut of this invention; and FIGURE 4 is a fragmentary cross-sectional plan view taken along the line 4—4 of FIGURE 3, and showing the manner in which the bands engage the nut.

DESCRIPTION OF THE PREFERRED EMBODIMENT

The nut is generally indicated at 11 and comprises a member 12 which may be a sheet metal stamping and is bent into a cylindrical form with facing edges 13 and 14 in spaced parallel relation, so as to leave a split or gap 15 which is considerably narrower than the diameter of the bolt to be received by the nut.

A pair of transverse aligned apertures are formed at the midportion of the cylinder, one aperture 16 being centered on split 15 and the other aperture 17 being diametrically opposite the split. A pair of upset locating protrusions 18 and 19 are formed from the material surrounding aperture 16, so as to fit between a pair of bands, later described, to prevent shifting movement of the nut in a direction transverse to the bolt axis. The material 21 around aperture 17 is bent inwardly into the space within the cylinder so as to increase the axial length of this aperture.

Both apertures 16 and 17 are tapped to provide threads matching those of the bolt 22 to be received by the nut. In its normal unstressed condition as shown in FIGURE 1, the nut may turn freely on bolt 22.

The nut is intended for use in conjunction with a pair of bands 23 and 24, as seen in FIGURES 3 and 4. These bands will extend across split 15 on either side of protrusions 18 and 19, and the nut will be drawn toward them, that is, to the right as seen in FIGURE 4, bands 23 and 24 being restrained. This action of the split portion of the nut pressing against the bands will cause the cylinder to contract, tending to close split 15. This will cause the threads of aperture 16 to be pressed against bolt 22, so that continued rotation of the bolt will cause the nut to lock itself onto the bolt.

Although bands 23 and 24 could take various shapes, they are shown as being looped back on themselves and being attached to one end of a strap 25 such as is used to clamp a hose to a fitting. The other end of the strap carries a similar band means 28 which retains a cylinder 27. Bolt 22 passes through unthreaded apertures in this cylinder and its head 28 engages the cylinder. Thus, the connections of bolt 22 with both ends of strap 25 are such as to permit a rocking action of the strap ends with respect to the bolt during tightening or loosening of the bolt.

When the bolt is loosened, removal of the forces of bands 23 and 24 across split 15 will permit the nut 11 to expand slightly, releasing the locking action.

What is claimed is:

1. A self-locking barrel nut in combination with a pair of spaced bands, wherein said nut is received within loops formed in said bands and is adapted to be drawn against said bands, said nut comprising a stamped sheet metal member bent into the form of a cylinder with spaced parallel facing edges forming a split therebetween considerably smaller in width than the diameter of the bolt to be received by the nut, and a pair of transversely aligned apertures in the cylinder at the midportion thereof, one aperture being centered on the split in the form of a substantially semi-circular recess on each side thereof and the other aperture diametrically opposite the split, said apertures being axially aligned and being tapped to receive the bolt threads, whereby urging of the split portion of said cylinder against said bands will cause contraction of the cylinder and tightening of the threads of said first aperture against the bolt to create a self-locking action.

2. The combination according to claim 1, the material surrounding said first aperture being upset to form a pair of locating protrusions on the outer surface of said cylinder disposed between said bands.

3. The combination according to claim 1 or 2, the material surrounding said second aperture being bent nwardly into said cylinder to increase the thread distance of said second aperture.

4. The combination according to claim 1 or 2, said bands being looped back on themselves and secured to one end of a circular clamping strap, a second pair of looped-back bands secured adjacent the other end of said strap, and a second cylindrical member retained by said second pair of straps receiving and engaged by the head of said bolt.

5. The combination according to claim 1 or 2, said cylindrical nut having sufficient spring that loosening of the nut with respect to the bands which it engages will permit expansion of said first aperture and releasing of said locking action.

References Cited

UNITED STATES PATENTS

| | | |  |
|---|---|---|---|
| 1,348,787 | 8/1920 | Du Puy. | |
| 1,681,008 | 8/1928 | Petermann. | |
| 2,654,923 | 10/1953 | Johnson. | |
| 2,727,292 | 12/1955 | Houghton | 24—279 |
| 2,940,151 | 6/1960 | Skelly | 24—279 |
| 3,110,948 | 11/1963 | Voss | 24—279 |
| 3,317,974 | 5/1967 | Sisler | 24—279 |

RAMON S. BRITTS, Primary Examiner

U.S. Cl. X.R.

24—279; 151—41.7